(12) United States Patent
Liang

(10) Patent No.: US 8,331,997 B2
(45) Date of Patent: Dec. 11, 2012

(54) ROTATING MECHANISM AND ELECTRONIC DEVICE USING SAME

(75) Inventor: Shi-Xu Liang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 202 days.

(21) Appl. No.: 12/862,858

(22) Filed: Aug. 25, 2010

(65) Prior Publication Data

US 2011/0287815 A1    Nov. 24, 2011

(30) Foreign Application Priority Data

May 20, 2010    (CN) .......................... 2010 1 0178217

(51) Int. Cl.
*H04M 1/00*    (2006.01)

(52) U.S. Cl. .................................. 455/575.1; 455/575.4

(58) Field of Classification Search ..... 455/575.1–575.8
See application file for complete search history.

(56) References Cited

U.S. PATENT DOCUMENTS

| | | | |
|---|---|---|---|
| 2008/0242380 A1* | 10/2008 | Kajihara et al. | ........... 455/575.1 |
| 2009/0298560 A1* | 12/2009 | Saitoh | ......... 455/575.4 |
| 2010/0029348 A1* | 2/2010 | Lee et al. | ................... 455/575.1 |
| 2010/0137041 A1* | 6/2010 | Lee | .............. 455/575.4 |
| 2010/0178963 A1* | 7/2010 | Iwaki | ......................... 455/575.4 |
| 2011/0143818 A1* | 6/2011 | Makino et al. | ................. 455/566 |

* cited by examiner

*Primary Examiner* — Lana N Le
(74) *Attorney, Agent, or Firm* — Altis Law Group, Inc.

(57) ABSTRACT

A rotating mechanism comprises a retaining plate having a cut-out defined therethrough, the cut-out is curved; a rotating plate being capable of rotating in a plane parallel to the plane of the retaining plate by a shaft extending through the retaining plate and the rotating plate; a pin rotatably affixed to the rotating plate and slidably engaging with the cut-out to guide rotating movement of the rotating plate when the rotating plate rotates around the shaft in a plane parallel to the plane of the retaining plate.

19 Claims, 5 Drawing Sheets

ROTATING MECHANISM AND ELECTRONIC DEVICE USING SAME

CROSS-REFERENCE TO RELATED APPLICATIONS

This application is related to co-pending U.S. patent application Ser. Nos. 12/862,859, 12/862,860 and 12/862,861, all entitled "ROTATING MECHANISM AND ELECTRONIC DEVICE USING SAME", by Liang Shi-Xu. These applications have the same assignee as the present application and have been concurrently filed herewith. The above-identified applications are incorporated herein by reference.

BACKGROUND

1. Technical Field

This disclosure relates to rotating mechanisms, particularly to rotating mechanisms used in an electronic device.

2. Description of Related Art

A typical portable electronic device, such as a mobile phone, generally includes a lower element and an upper element with a display mounted thereon. However, many conventional electronic devices use complicated components and methods to enable relative rotation between the upper and lower elements.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary rotating mechanism for electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
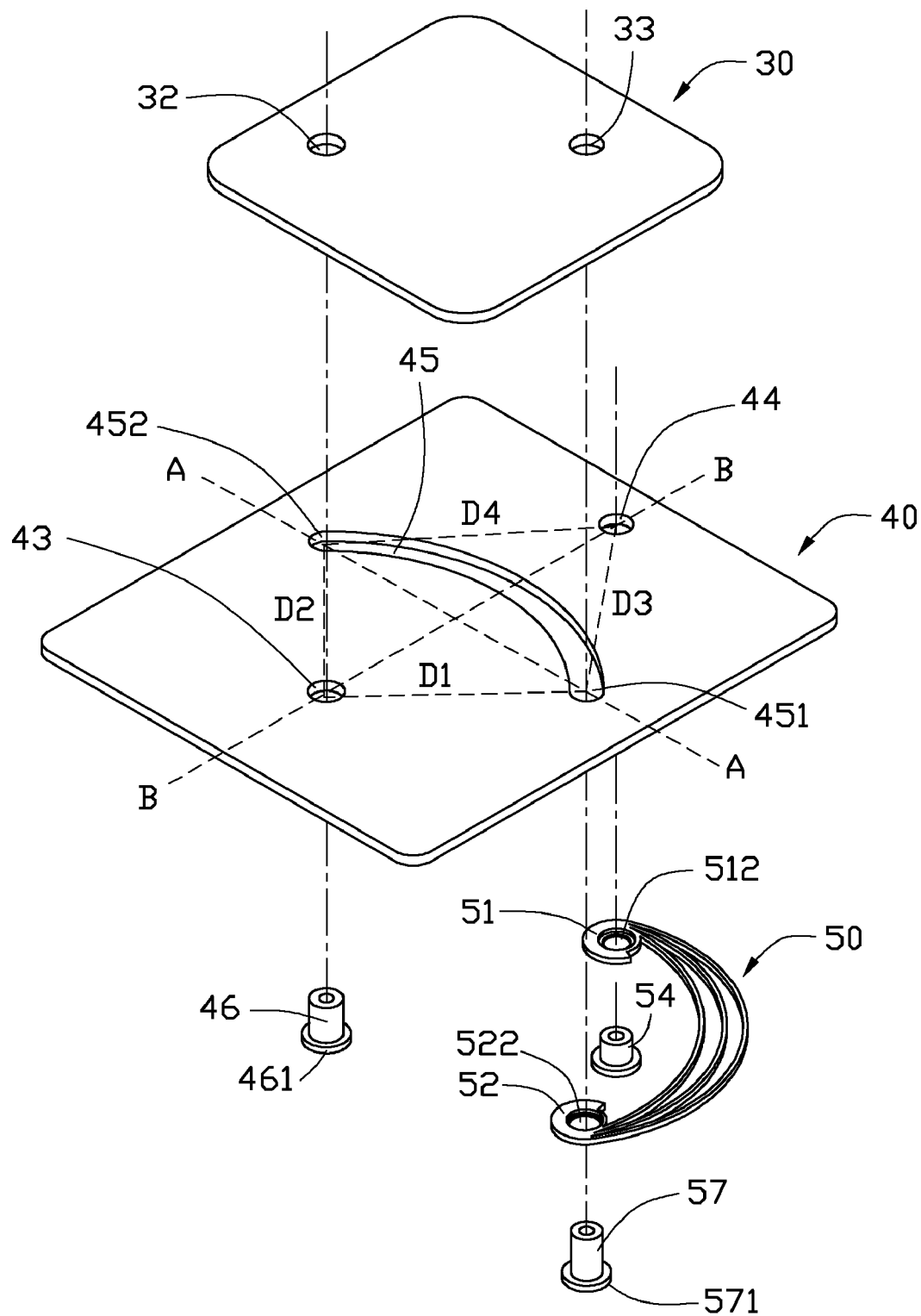
FIG. 1 is an exploded view of an exemplary embodiment of a rotating mechanism.
Figure 2:
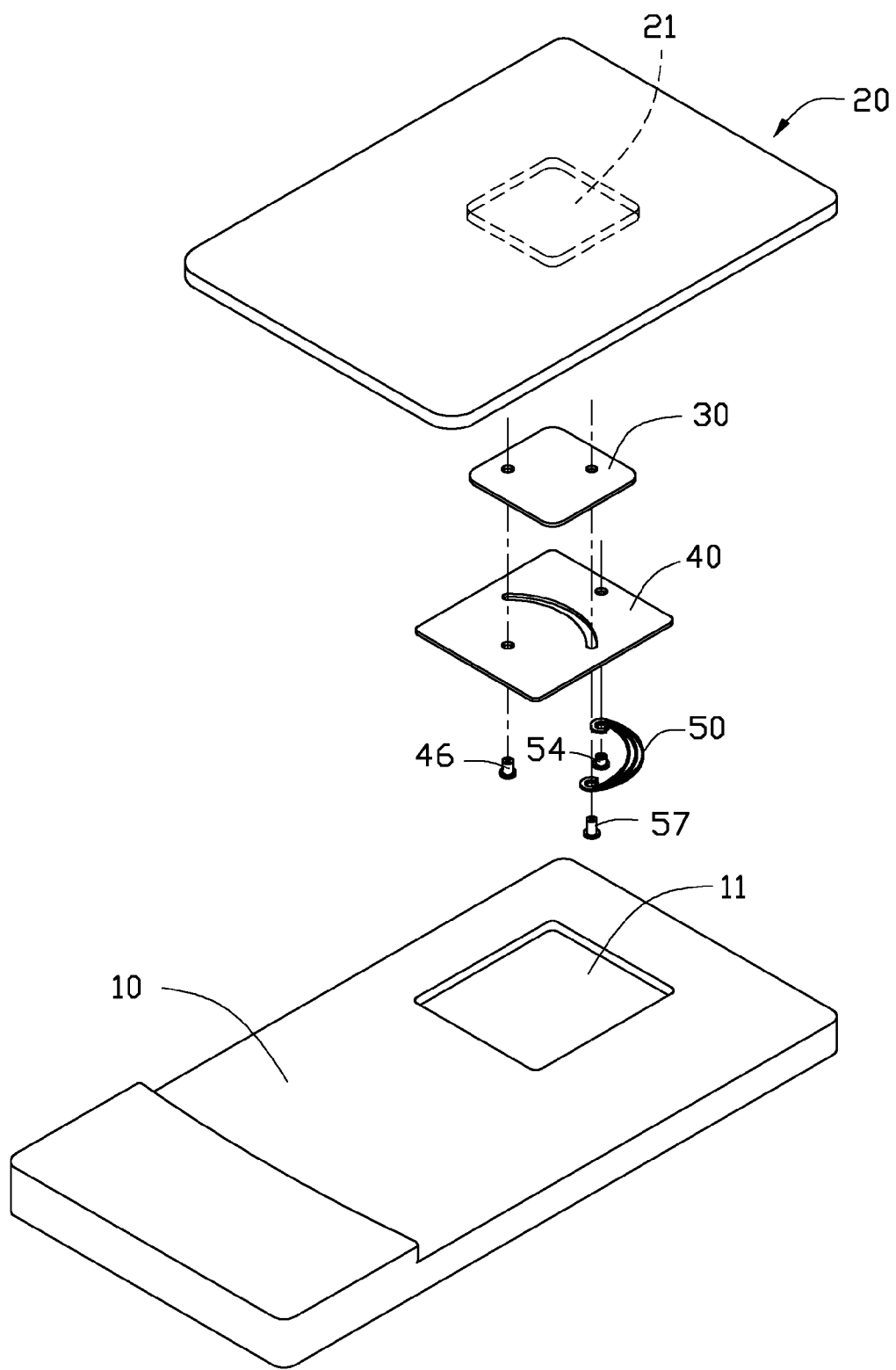
FIG. 2 is an exploded view of an electronic device using the rotating mechanism shown in FIG. 1.

FIG. 1 illustrates an exploded view of an exemplary rotating mechanism 100. FIG. 2 illustrates an exploded view of an electronic device (not labeled) using the rotating mechanism 100 shown in FIG. 1. The electronic device includes an upper housing 20 and a lower housing 10, which are connected by the rotating mechanism 100. The upper housing 20 defines a receptacle 21 facing the lower housing 10 and the lower housing 10 defines a compartment 11 facing to the receptacle 21. The receptacle 21 and the compartment 11 cooperatively accommodate the rotating mechanism 100.

The rotating mechanism 100 includes a retaining plate 40 and a rotating plate 30 which are rotatably coupled by a rotation enabling member as described below. The retaining plate 40 is mounted to the lower housing 10 and the rotating plate 30 is mounted to the upper housing 20 so the upper housing 20 can rotate with the rotating plate 30 relative to the lower housing 10 when the rotating plate 30 rotates relative to the retaining plate 40. The rotation enabling member is coupled between the retaining plate 40 and the rotating plate 30 so the rotating plate 30 rotatably engages with the retaining plate 40. The rotation enabling member, in this exemplary embodiment, comprises a pin 57, a cut-out 45 that engages the pin 57, and a shaft 46. The pin 57 is retained on or rotatably affixed to the rotating plate 30 and extends into the cut-out 45; in this exemplary embodiment, the pin 57 is retained in a retaining hole 33 defined in the rotating plate 30. A distal end 571 of the pin 57 is wider than the cut-out 45 so the pin 57 always engages the cut-out 45 when the pin 57 passes through the cut-out 45 thereby retaining the rotating plate 30 to the retaining plate 40. As the rotating plate 30 rotates relative to the retaining plate 40, the pin 57/cut-out 45 combination prevents separation of the rotating plate 30 and the retaining plate 40. In this exemplary embodiment, the cut-out 45 is a curved groove defined in the retaining plate 40, including a first cut-out end 451 and a second cut-out end 452. In this exemplary embodiment, the retaining plate 40 may be square. An imaginary line A-A connecting the first cut-out end 451 and the second cut-out end 452 is parallel to one of the pair of parallel sides of the retaining plate 40.

The shaft 46 is rotatably affixed to the rotating plate 30 and rotatably engages with the retaining plate 40 so the rotating plate 30 can rotate about the shaft 46 in a plane parallel to the plane of the retaining plate 40. In this exemplary embodiment, the shaft 46 is retained in a securing hole 32 defined in the rotating plate 30 and extends into a shaft hole 43 defined in the retaining plate 40, and the shaft 46 is slightly smaller than the shaft hole 43 so the shaft 46 can rotate in the shaft hole 43. A distal end 461 of the shaft 46 is wider than the shaft hole 43 preventing the shaft 46 from passing through the shaft hole 43 thereby retaining the rotating plate 30 to the retaining plate 40. As the rotating plate 30 rotates relative to the retaining plate 40, the shaft 46/shaft hole 43 combination prevent separation of the rotating plate 30 and the retaining plate 40. The pin 57 slides from the first cut-out end 451 to the second cut-out end 452 when the rotating plate 30 rotates about the shaft 46 relative to the retaining plate 40 from a first (e.g. closed) position shown in FIG. 3 to an intermediate position shown in FIG. 4 and a rotated third (e.g. open) position shown in FIG. 5. In this exemplary embodiment, the shaft hole 43 is located at one side of the cut-out 45, and the distance D1 between the shaft hole 43 and the first cut-out end 451 is equal to the distance D2 between the shaft hole 43 and the second cut-out end 452.

Figure 3:
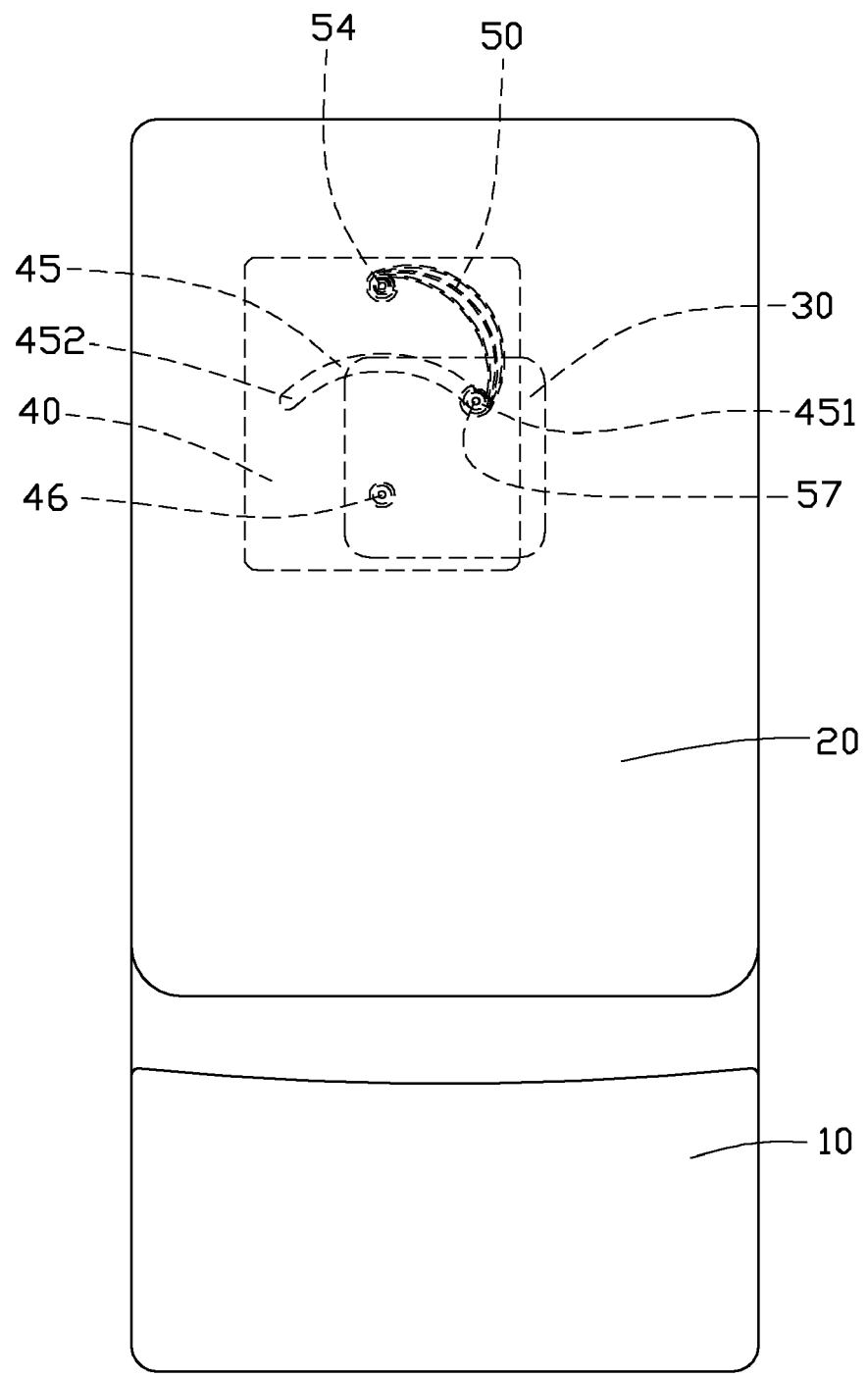
FIG. 3 is an assembled and partially perspective view of the electronic device in a first position.
Figure 4:
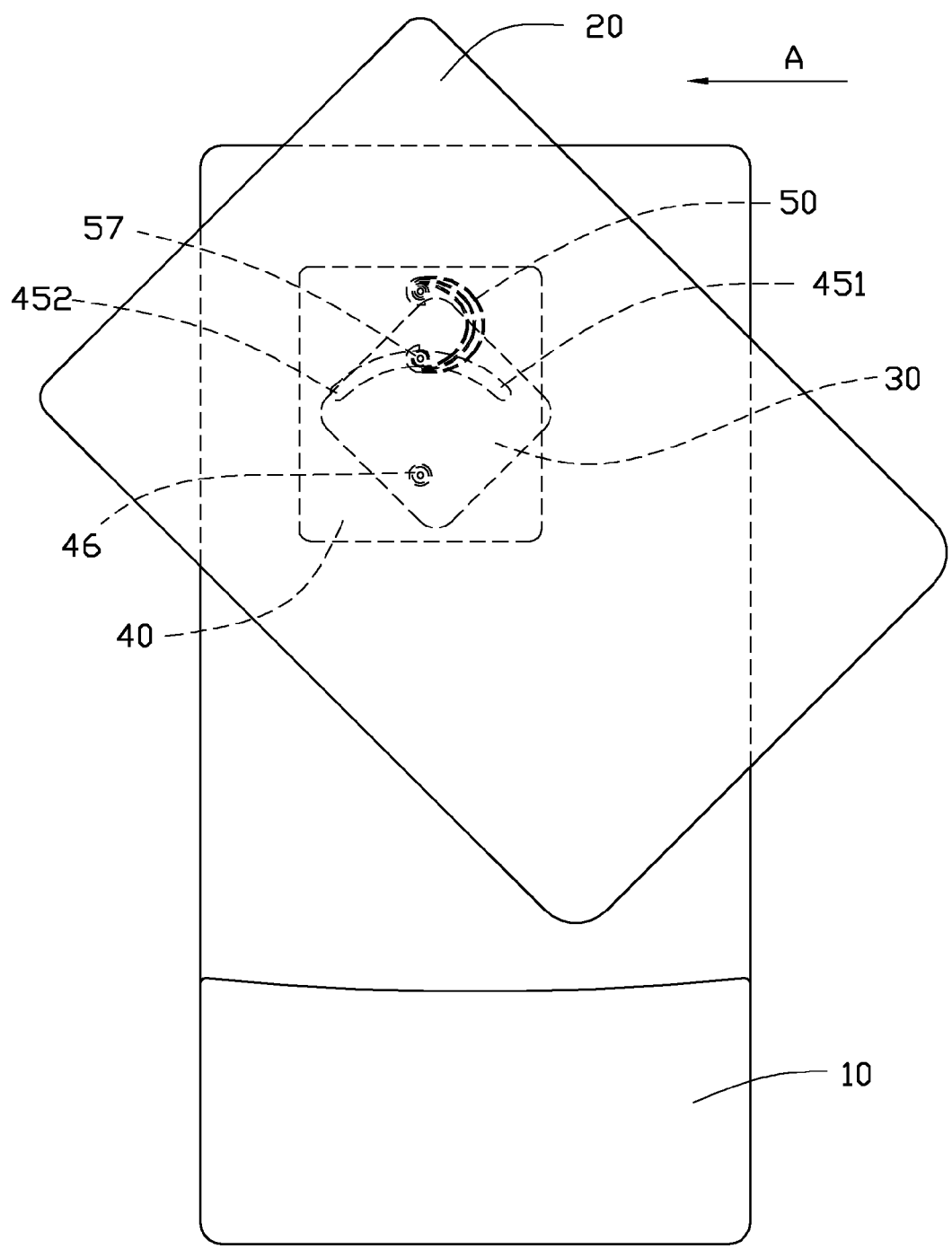
FIG. 4 is an assembled and partially perspective view of the electronic device in an intermediate position.

Referring to FIGS. 1 and 3, a biasing member 50 exerts a force on the pin 57 to cause the pin 57 to automatically slide relative to the cut-out 45. The biasing member 50 is coupled between the rotating plate 30 and the retaining plate 40. When the rotating plate 30 rotates from a first (e.g., the closed) position shown in FIG. 3 to the intermediate position shown in FIG. 4, the biasing member 50 compresses to exert a force on the rotating plate 30 and the retaining plate 40. Once the rotating plate 30 transitions to the intermediate position shown in FIG. 4, the rotating plate 30 automatically rotates toward the third (e.g. open) position shown in FIG. 5 under the decompressing force exerted from the compressed biasing member 50. The biasing member 50 may be a spring, which has a first biasing member end 51 retained to the retaining plate 40 and a second biasing member end 52 retained to the rotating plate 30. The first biasing member end 51 defines a first latching hole 512, the retaining plate 40 defines a retaining bore 44, and a retaining post 54 is inserted in the first latching hole 512 and the retaining bore 43 so the first biasing member end 51 is retained to the retaining plate 40. The second biasing member end 52 defines a second latching hole 522, and the pin 57 inserts through the second latching hole 522 so the second biasing member end 52 retains to the rotating plate 30. In this exemplary embodiment, the retaining bore 44 is located at another side of the cut-out 45 opposite to the shaft hole 43, and an imaginary line B-B connecting shaft hole 43 and the retaining bore 44 is perpendicular to imaginary line A-A. The distance D3 between the retaining bore 44 and the first cut-out end 451 is equal to the distance D4 between the retaining bore 44 and the second cut-out end 452.

Referring to FIGS. 1-3, in assembly, the first latching hole 512 is aligned with the retaining bore 44, and then the retaining post 54 is inserted in the first latching hole 512 and the retaining bore 44 to retain the first biasing member end 51 to the retaining bore 44. The second latching hole 522 is aligned with the first cut-out end 451 and the retaining hole 33, and then the pin 57 is inserted in the first latching hole 512, the first cut-out end 451 and the retaining hole 33 so the first biasing member end 51 is retained in the retaining hole 33 and the cut-out 45. The shaft hole 43 is aligned with the securing hole 32, and then the shaft 46 is inserted in the shaft hole 43 and the securing hole 32 so the rotating plate 30 is rotatably hinged to the retaining plate 40. Finally, the rotating plate 30 is retained in the receptacle 21 to mount the rotating plate 30 to the upper housing 20 and the retaining plate 40 is retained in the compartment 11 to mount the retaining plate 40 to the lower housing 10.

Figure 5:
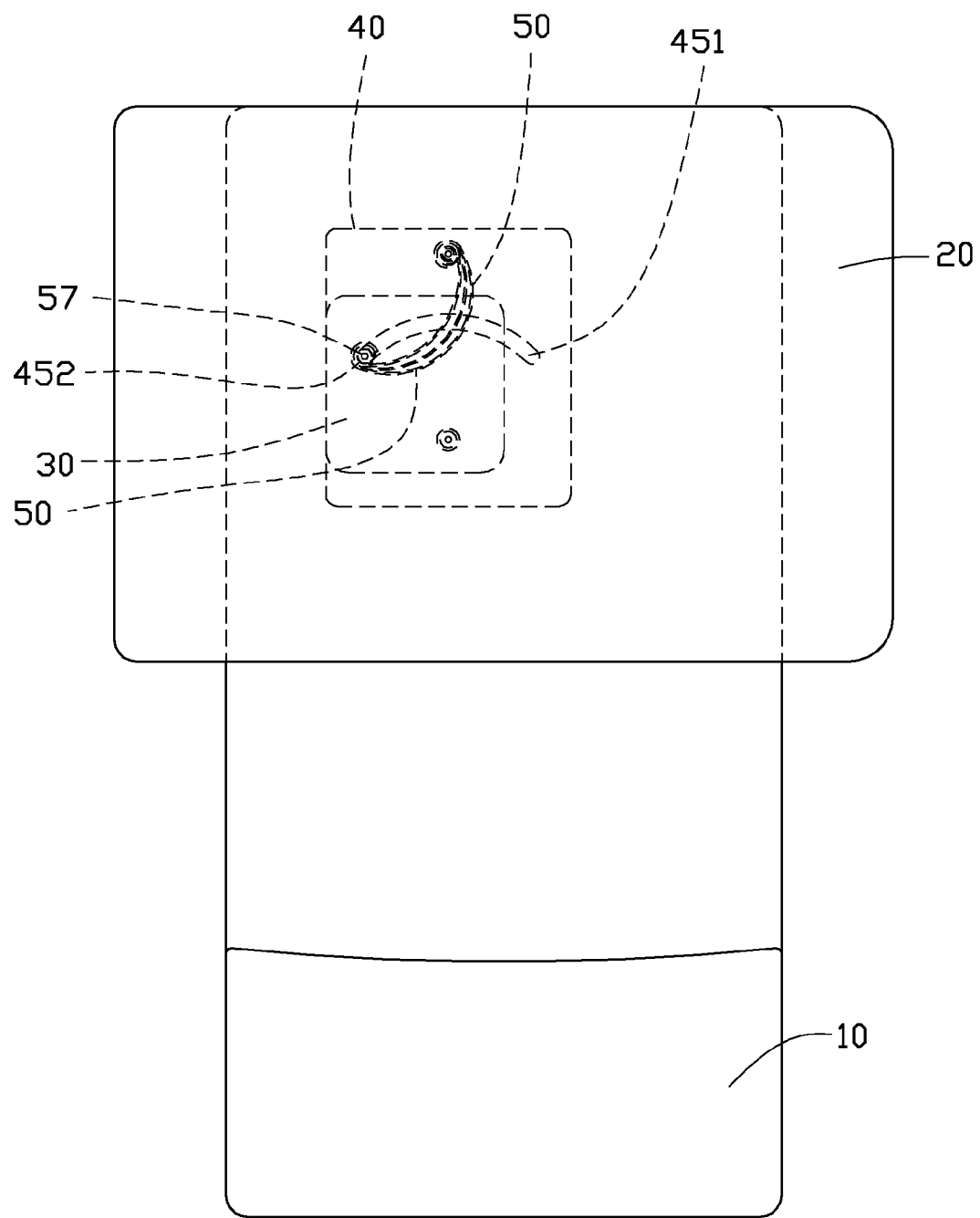
FIG. 5 is an assembled and partially perspective view of the electronic device in a rotated third position.

Referring to FIGS. 3 and 5, in use, the upper housing 20 can rotate relative to the lower housing 10 by the rotating plate 30 rotating about the shaft 46 relative to the retaining plate 40. At this time, the pin 57 slides from the first cut-out end 451 toward the second cut-out end 452 and the biasing member 50 is compressed. When the pin 57 slides to and transitions to the intermediate position of the cut-out 45, the biasing member 50 expands and the pin 57 automatically slides in the cut-out 45 to the second cut-out end 452 and the rotating plate 30 rotates about the shaft 46 relative to the retaining plate 40. Thus, the upper housing 20 is automatically rotated relative to the lower housing 10 as shown in FIG. 5.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A rotating mechanism, comprising:
   a retaining plate having a curved cut-out defined therethrough;
   a rotating plate capable of rotating in a plane parallel to the plane of the retaining plate by a shaft extending through holes in the retaining plate and the rotating plate; and
   a pin rotatably affixed to a hole in the rotating plate and slidably engaging with the cut-out to guide rotating movement of the rotating plate when the rotating plate rotates around the shaft in a plane parallel to the plane of the retaining plate;
   wherein the cut-out includes a first cut-out end and a second cut-out end; and
   wherein the retaining plate has a pair of parallel sides, and an imaginary line connecting the first cut-out end and the second cut-out end is parallel to the parallel sides.

2. The rotating mechanism claimed in claim 1, further comprises a biasing member comprising a first biasing member end and a second biasing member end, the first biasing member end is rotatably affixed to the retaining plate and the second biasing member end is rotatably affixed to the pin.

3. The rotating mechanism claimed in claim 2, wherein when the rotating plate rotates from a first position to an intermediate position, the biasing member is compressed by the pin to exert a force on the rotating plate and the retaining plate causing the rotating plate to automatically rotate toward a third position once the rotating plate passes the intermediate position.

4. The rotating mechanism claimed in claim 2, wherein a distal end of the pin opposite to the retaining plate is wider than the cut-out to prevent separation of the pin from the retaining plate.

5. The rotating mechanism claimed in claim 2, wherein the first biasing member end defines a first latching hole, the retaining plate defines a retaining bore; a retaining post is inserted in the first latching hole and the retaining bore to retain the first biasing member end to the retaining plate.

6. The rotating mechanism claimed in claim 5, wherein the retaining bore is located at one side of the cut-out, and a distance between the retaining bore and the first cut-out end is equal to a distance between the retaining bore and the second cut-out end.

7. The rotating mechanism claimed in claim 6, wherein the pin slides from the first cut-out end to the second cut-out end when the rotating plate rotates around the shaft relative to the retaining plate between the first position and the third position.

8. The rotating mechanism claimed in claim 7, wherein the shaft is rotatably affixed to the rotating plate and rotatably engages with the retaining plate.

9. The rotating mechanism claimed in claim 8, wherein the shaft is retained in a securing hole defined in the rotating plate and extends into an shaft hole defined in the retaining plate, and the shaft is slightly smaller than the shaft hole so the shaft can rotate in the shaft hole.

10. The rotating mechanism claimed in claim 9, wherein the shaft hole is located at another side of the cut-out opposite to the retaining bore, and a distance between the shaft hole and the first cut-out end is equal to the distance between the shaft hole and the second cut-out end.

11. A rotating mechanism, comprising:
    a retaining plate;
    a rotating plate horizontally rotatable relative to the retaining plate; and
    a rotation enabling member comprising a shaft for hinging the rotating plate to the retaining plate, a guiding groove, and a guiding pin slidably engages in the guiding groove, the guiding groove being configured for guiding the rotating plate move in a predetermined path when the rotating plate horizontally rotates around the shaft;
    wherein the retaining plate defines a curved cut-out therethrough, and the cut-out includes a first cut-out end and a second cut-out end; and
    wherein the retaining plate has a pair of parallel sides, and an imaginary line connecting the first cut-out end and the second cut-out end is parallel to the parallel sides.

12. The rotating mechanism claimed in claim 11, wherein the guiding groove is curved and includes a first end and a second end, the guiding pin is positioned on the rotating plate and extends into the guiding groove, the guiding groove is defined in the retaining plate.

13. The rotating mechanism claimed in claim 12, further comprises a biasing member comprising a first biasing member end and a second biasing member end, the first biasing member end is rotatably affixed to the retaining plate and the second biasing member end is rotatably affixed to the pin.

14. The rotating mechanism claimed in claim 13, wherein when the rotating plate rotates from the first position to an intermediate position, the biasing member is compressed by the pin to exert a force on the rotating plate and the retaining plate causing the rotating plate to automatically rotate toward the third position once the rotating plate passes the intermediate position.

15. The rotating mechanism claimed in claim 14, wherein the first biasing member end defines a first latching hole, the retaining plate defines a retaining bore; a retaining post is inserted in the first latching hole and the retaining bore so the first biasing member end is retained to the retaining plate.

16. An electronic device, comprising:
  an upper housing;
  an lower housing; and
  a rotating mechanism comprising:
    a retaining plate having a curved cut-out defined therethrough, the retaining plate mounted to the lower housing;
    a rotating plate being capable of rotating in a plane parallel to the plane of the retaining plate by a shaft extending through holes in the retaining plate and the rotating plate, the rotating plate mounted to the upper housing; and
    a pin rotatably affixed to the rotating plate and slidably engaging with the cut-out to guide rotating movement of the rotating plate when the rotating plate rotates around the shaft in a plane parallel to the plane of the retaining plate;
  wherein the cut-out includes a first cut-out end and a second cut-out end; and
  wherein the retaining plate has a pair of parallel sides, and an imaginary line connecting the first cut-out end and the second cut-out end is parallel to the parallel sides.

17. The electronic device claimed in claim 16, further comprises a biasing member comprising a first biasing member end and a second biasing member end, the first biasing member end is rotatably affixed to the retaining plate and the second biasing member end is rotatably affixed to the pin.

18. The electronic device claimed in claim 17, wherein when the rotating plate rotates from a first position to an intermediate position, the biasing member is distorted by the pin to exert a force on the rotating plate and the retaining plate causing the rotating plate to rotate toward an third position once the rotating plate passes the intermediate position.

19. The electronic device claimed in claim 17, wherein a distal end of the pin opposite to the retaining plate is wider than the cut-out to prevent separation of the pin from separating from the retaining plate.

* * * * *